US005708751A

United States Patent [19]

Mattei

[11] Patent Number: 5,708,751
[45] Date of Patent: Jan. 13, 1998

[54] OPTICAL FIBER ENCLOSURE SYSTEM

[75] Inventor: Michael Mattei, Smithtown, N.Y.

[73] Assignee: TII Industries, Inc., Copiague, N.Y.

[21] Appl. No.: 636,965

[22] Filed: Apr. 24, 1996

[51] Int. Cl.$^6$ ................................................. G02B 6/36
[52] U.S. Cl. ................................. 385/135; 385/134
[58] Field of Search .................................. 385/134, 135, 385/136, 137, 138, 139, 147

[56] References Cited

U.S. PATENT DOCUMENTS

| | | | |
|---|---|---|---|
| D. 297,136 | 8/1988 | Collins et al. | D13/40 |
| D. 304,339 | 10/1989 | Collins et al. | D14/240 |
| D. 314,759 | 2/1991 | Collins et al. | D13/184 |
| 4,171,867 | 10/1979 | Cocito | 350/96.21 |
| 4,266,853 | 5/1981 | Hutchins et al. | 350/96.2 |
| 4,489,830 | 12/1984 | Charlebois et al. | 350/96.21 X |
| 4,502,754 | 3/1985 | Kawa | 350/96.2 |
| 4,518,817 | 5/1985 | Kirby et al. | 174/38 |
| 4,595,255 | 6/1986 | Bhatt et al. | 385/135 |
| 4,627,686 | 12/1986 | Szentesi | 350/96.2 |
| 4,717,231 | 1/1988 | Dewez et al. | 350/96.2 |
| 4,846,565 | 7/1989 | Swanson et al. | 350/96.22 |
| 4,882,647 | 11/1989 | Collins et al. | 361/119 |
| 4,910,770 | 3/1990 | Collins et al. | 379/399 |
| 4,945,559 | 7/1990 | Collins et al. | 379/399 |
| 4,949,376 | 8/1990 | Nieves et al. | 379/399 |
| 4,979,209 | 12/1990 | Collins et al. | 379/399 |
| 5,029,958 | 7/1991 | Hodge et al. | 350/96.2 |
| 5,119,459 | 6/1992 | Meyerhoefer et al. | 385/135 |
| 5,274,731 | 12/1993 | White | 385/135 |
| 5,278,933 | 1/1994 | Hunsinger et al. | 385/135 |
| 5,367,598 | 11/1994 | Devenish, III et al. | 385/135 |

OTHER PUBLICATIONS

Manual of TII–Ditel – Optical Splice Closure 288 OSC 10/94.
AT&T Lightguide Shelf Combination (LSC) 2/1995.

*Primary Examiner*—Phan T.H. Palmer
*Attorney, Agent, or Firm*—Morgan & Finnegan

[57] ABSTRACT

An optical fiber enclosure system having a storage and splicing enclosure and one or more termination enclosures. The storage and splicing enclosure contains ports on all four of its sides that allow external fiber optic cables to access the interior of the enclosure. The storage and splicing enclosure includes hardware for storage of excess optical fiber and outer protective cabling components, grounding and securing spliced optical fibers. Termination enclosures may be attached to the any of the four sides of the storage and splicing enclosure. The storage and splicing enclosure has ports on all four of its sides that mate with ports on the termination enclosures to permit optical fiber to run therebetween. The termination enclosures includes hardware for mounting modules for terminating optical fibers. Attached to the termination modules are optical fibers that extend from the termination enclosure through ports in the termination enclosure and storage and splicing enclosure and into the storage and splicing enclosure. Those optical fibers are spliced to optical fibers forming the fiber optic cables in the storage and splicing enclosure. Additional fiber optic cables attached to the termination modules exit the termination enclosure through ports and run to an equipment rack at the customer premises where the optical fibers can be attached to customer equipment.

23 Claims, 12 Drawing Sheets

OPTICAL FIBER ENCLOSURE SYSTEM

TECHNICAL FIELD

The invention is related an optical fiber enclosure system and, in particular, a optical fiber enclosure system having a storage and splicing enclosure and one or more adjoining termination enclosures.

BACKGROUND OF THE INVENTION

Optical fiber communications systems are extensively used in the telecommunications industry due to their large information carrying capacity, there virtually noise-free performance and the long span distances achievable before regeneration and amplification of the signal is required. In any communication system employing optical fibers, distributions stations where optical fiber cross connections, interconnections and terminations can be performed are required. Often these distributions stations are located remote from central offices, for example, at customer premises or an area serviced by local area networks. Because at each distribution station, optical fibers must be separated from outer protective cable components for splicing and termination, several different types of fiber optic cable and optical fiber enclosures are currently available to offer protection. These include, for example, the optical fiber enclosures described in the U.S. Pat. No. 4,502,754 to Kawa dated Mar. 5, 1985, U.S. Pat. No. 5,119,459 to Meyerhoefer et al. dated Jun. 2, 1992, U.S. Pat. No. 4,717,231 to Dewez et al. dated Jan. 5, 1988, U.S. Pat. No. 5,274,731 to White dated Dec. 28, 1993, U.S. Pat. No. 5,278,933 to Hensinger et al. dated Jan. 11, 1994, TII-DITEL 288 OSC optical splice closure, Siecor FDC products and AT&T LSC products.

Typical prior art enclosures are designed for specific purposes and, thus, require multiple enclosures. Although, some prior art enclosures, such as Siecor FDC products and AT&T LSC products, are made of multiple components, the components generally lack the flexibility of being able to accept fiber optic cable from various directions through openings in the enclosures and to attach to each other in a variety of configurations.

For example, FIG. 1 represents a typical prior art optical fiber enclosure system for splicing and termination of optical fibers and connection of optical fibers to communications equipment at a customer premises. Cable conduit 2, containing a fiber optic cable, is connected to cable pull box 3. Such a fiber optic cable typically contains 72–144 individual optical fibers. The fiber optic cable within the cable conduit 2 extends into the cable pull box 3 were excess jacketed fiber optic cable can be stored. Because closures are often located on customer premises they are subject to frequent rearrangement as well as a changes in mounting location in order to accommodate new equipment. Providing for excess fiber optic cable in proximity to splice locations is desirable to allow for future growth and changes in service.

Fiber optic cables extend from cable pull box 3 through conduit 4 and into buffer tube storage and splicing enclosure 5. To permit splicing, fiber optic cables must be separated from outer protective cable sheathing to expose "buffer tubes", each of which typically contain 6 or 12 individual optical fibers. Buffer tube storage and splicing enclosure 5 permits storage of the buffer tubes to facilitate splicing. Such an enclosure typically accommodates one or more loops of excess buffer tubing without causing bending of the optical fibers contained in each buffer tube beyond their minimum bend radius.

The optical fiber in buffer tube storage and splicing enclosure 5 may be spliced and retained once spliced using anyone of a number of well known methods, for example, as shown in U.S. Pat. No. 4,627,686 to Szentesi dated Dec. 9, 1986, U.S. Pat. No. 4,171,867 to Cocito dated Oct. 23, 1979, U.S. Pat. No. 4,266,853 to Hutchins et al. dated May 12, 1981 and U.S. Pat. No. 4,489,830 to Charlebois et al. dated Dec. 25, 1984.

Optical fiber extends from the splice in buffer tube storage and splicing enclosure 5 through conduit 6 into termination housing 7. Termination housing 7 contains modules that facilitate the termination of the optical fibers. Optical fibers extend from the termination modules in the termination housing 7 through conduit 8 into equipment rack 9. In equipment rack 9, the optical fibers are connected to active communications equipment at the customer premises.

Such prior art optical fiber enclosure systems have the obvious disadvantage of requiring significant space at the customer premises and multiple enclosures and conduits to facilitate the storage and protection of fiber optic cables and the splicing and termination of optical fibers. Thus, there is a need for an economical multipurpose space efficient optical fiber enclosure system.

SUMMARY OF THE INVENTION

The invention provides for an optical fiber enclosure system having a storage and splicing enclosure and, if desired, one or more adjoining termination enclosures.

The storage and splicing enclosure contains ports on all four sides. The ports in the storage and splicing enclosure allow external fiber optic cables into the interior of the enclosure from any of the four sides. The storage and splicing enclosure includes hardware for (a) storage of excess jacketed fiber optic cable and buffer tubing; (b) grounding; and (c) securing spliced optical fibers.

Attached to the storage and splicing enclosure are one or more termination enclosures. The termination enclosures also have ports. The ports in the termination enclosure mate with the ports on one side in the storage and splicing enclosure to allow optical fibers to run therebetween. The termination enclosures may be mounted on any side of the storage enclosure. This allows users to route external fiber into the storage enclosure from one side while using the remaining three sides to mount termination modules.

The termination enclosure includes modules for terminating optical fibers. Attached to the termination modules are optical fibers that extend from the termination enclosure into the storage and splicing enclosure. Those optical fibers are spliced to the optical fibers contained in the buffer tubes in the storage and splicing enclosure. Additional optical fibers attached to the termination modules exit the termination enclosure through ports in the termination enclosure and run to an equipment rack at the customer premises where the optical fibers can be attached to customer equipment.

Thus, as will be fully appreciated from the description of the preferred embodiments set forth below, the optical fiber enclosure system according to the invention allows for efficient utilization of space, choice of cable entry direction, choice of termination module quantity and location and ease of fiber optic cable storage and optical fiber splicing and termination.

DETAILED DESCRIPTION OF PREFERRED EMBODIMENTS

Figure 1:
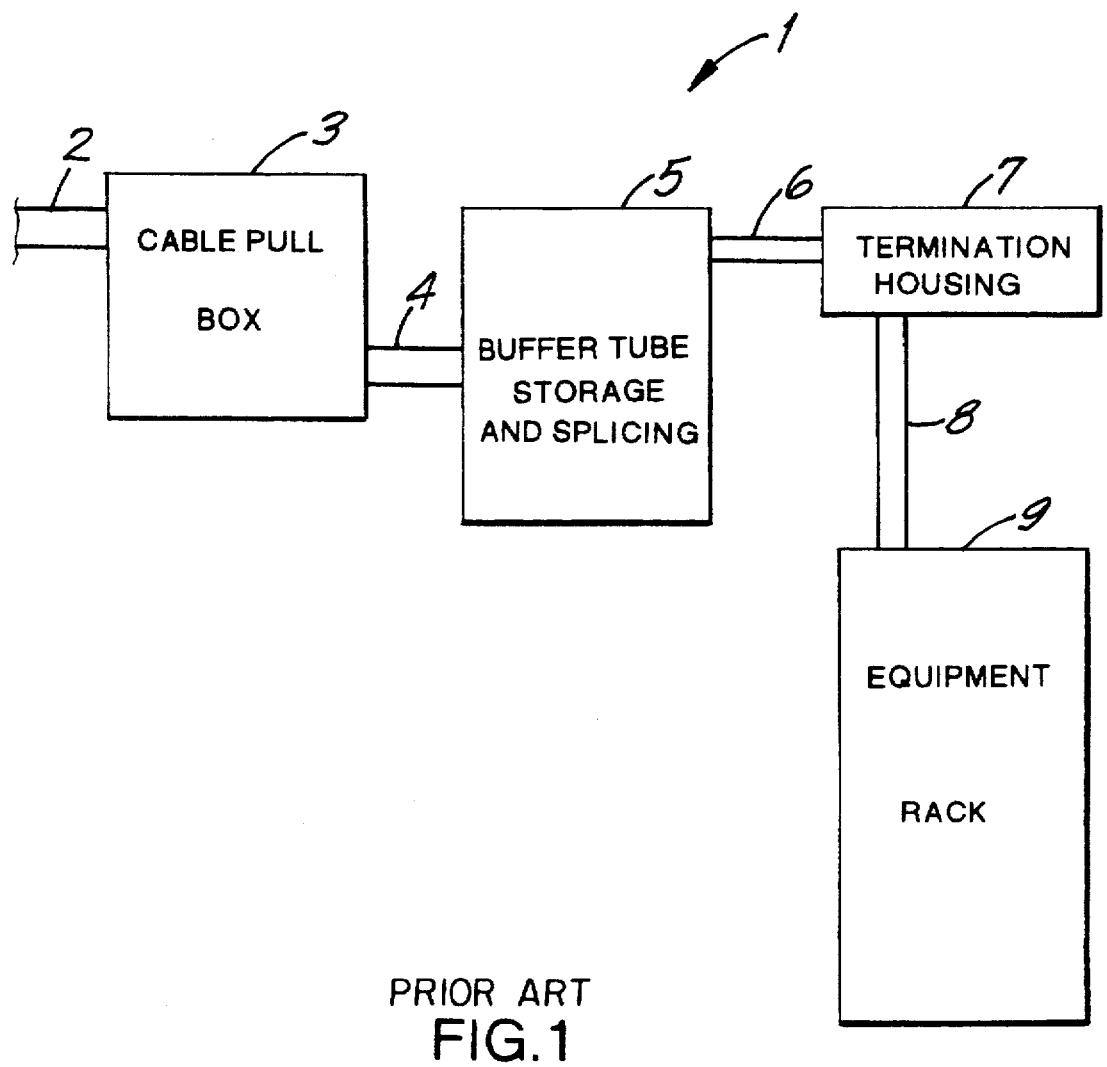
FIG. 1 schematically represents a typical prior art optical fiber enclosure system.
Figure 2:
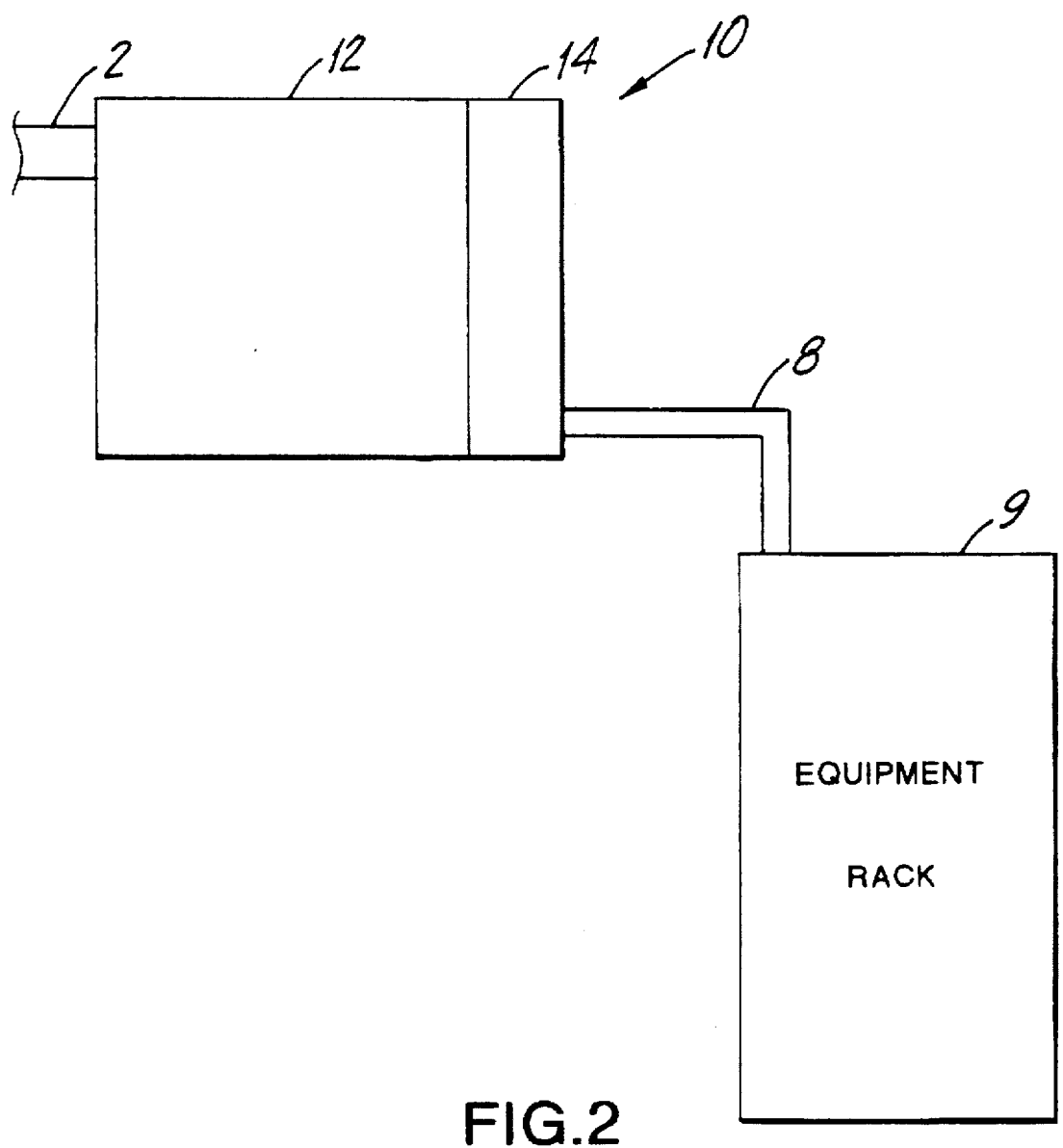
FIG. 2 schematically represents an optical fiber enclosure system in accordance with the invention.

Referring to FIG. 2, there shown schematically the optical fiber enclosure system 10 of the invention. The optical fiber enclosure system 10 comprises a storage and splicing enclosure 12 and one or more termination enclosures 14 adjoining the storage and splicing enclosure 12.

Conduit 2, which contains fiber optic cable from an external source, is attached to the storage and splicing enclosure 12 in such a way that the fiber optic cable contained in conduit 2 can enter the storage and splicing enclosure 12. Storage and splicing enclosure 12 contains sufficient internal space for storage of excess fiber optic cable and buffer tubing inside of the enclosure 12 and provides retainers for securing the same. The storage and splicing enclosure 12 also provides retainers for securing spliced optic fibers.

If desired, one or more a termination enclosures 14 may be attached to the storage and splicing enclosure 12. The termination enclosures 14 and the storage and splicing enclosure 12 are attached in such a way that optical fibers can extend between the storage and splicing enclosure 12 and the adjoining termination enclosures 14. In addition, cable may enter the storage enclosure from any of its four sides. Each of the four sides contain entry ports. Those ports also match the ports of the termination modules. Thus, termination modules may be mounted to any of the four sides of the storage enclosure and may also be mounted to more than one side simultaneously. The termination enclosures 14 contains modules for terminating optical fibers. Attached to the termination modules are optical fibers that extend from termination enclosures 14 into storage splicing enclosure for splicing to the optical fibers contained in the storage and splicing enclosure. Optical fibers extend from the termination modules in termination enclosure 14 through liquid tight conduit 8 into equipment rack 9 were the optical fibers can be connected to communications equipment at the customer premises.

Figure 3:
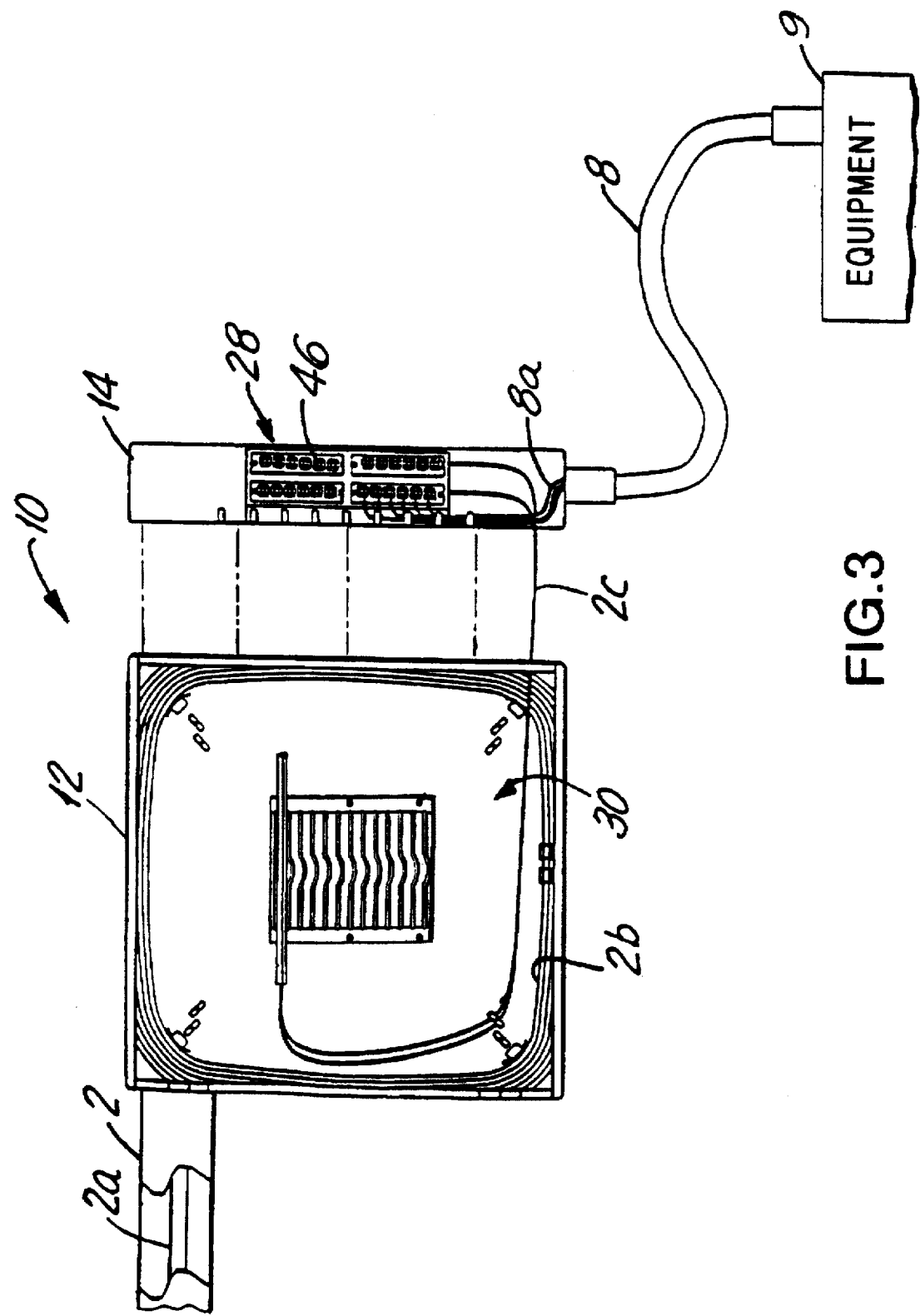
FIG. 3 shows a sectional view of an optical fiber enclosure system in accordance with the invention.

FIGS. 3–13 depict the preferred embodiment of the optical fiber enclosure system of the invention. FIG. 3 is a sectional view of an optical fiber enclosure system in accordance with the invention. Conduit 2, which contains fiber optic cable 2a, is attached to storage and splicing enclosure 12 in such a way that fiber optic cable 2a can extend from conduit 2 into storage and splicing enclosure 12.

Storage and splicing enclosure 12 is designed so that excess fiber optic cable 2a can be stored in the inside of enclosure 12. To splice individual optical fibers contained in fiber optic cables 2a, the optical fibers must be removed from the outer protective cable sheathing (or jacketing) that comprise part of the fiber optic cable to expose buffer tubes containing individual optical fibers. Storage and splicing enclosure 12 is also designed so that excess buffer tubing can be stored in the inside of the enclosure 12. The excess fiber optic cable and buffer tubing are wrapped around the inside of enclosure 12 and secured to the inside of the enclosure 12 (indicated generally at 30). The excess fiber optic cable and buffer tubing are segregated inside storage and splicing enclosure 12 to allow free access to the interior 30 of the storage and splicing enclosure 12. Provision is made to store up to 10 meters of fiber optic cable and up to 10 meters of buffer tubing from up to 4 separate cables in storage and splicing enclosure 12.

The end of each individual optical fiber in the buffer tube is spliced to optical fiber 2c at a splice tray 32. Each splice tray 32 typical provides for splicing of 12 individual optical fibers. Optical fibers 2c are connected at the time of manufacture to termination modules 46 in termination enclosure 14. Storage and splicing enclosure 12 and termination enclosure 14 have matching openings that allow fibers 2b to extend from storage and splicing enclosure 12 into termination enclosure 14. Through the splice at splice tray 32 and optical fiber 2c, optical fibers that comprise fiber optic cable 2a are connected to optical fiber termination modules 46 in termination enclosure 14. Each termination module typically allows for termination of 6 optical fibers.

At the termination modules 46, optical fibers 2c are connected to optical fibers 8a that extend from the termination modules 46 through a liquid tight conduit 8 to communications equipment rack 9. A liquid tight conduit connects the termination enclosure 14 and communications equipment rack 19 to avoid physical damage to the fibers. At the communications rack 9, optical fibers 8a are connected to active communications equipment at the customer premises.

Figure 4:
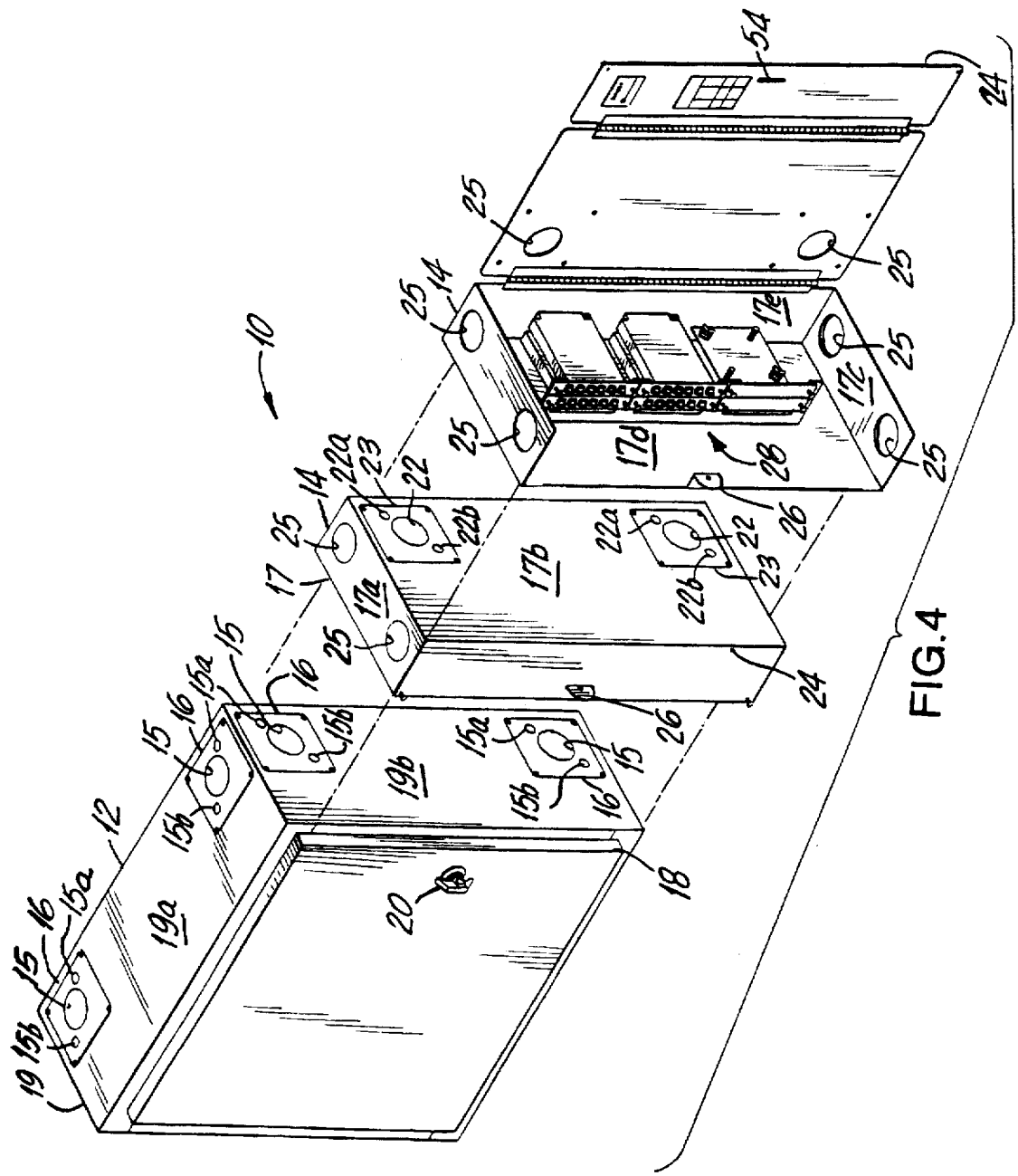
FIG. 4 is a perspective view of an optical fiber enclosure system in accordance with the invention.
Figure 5:
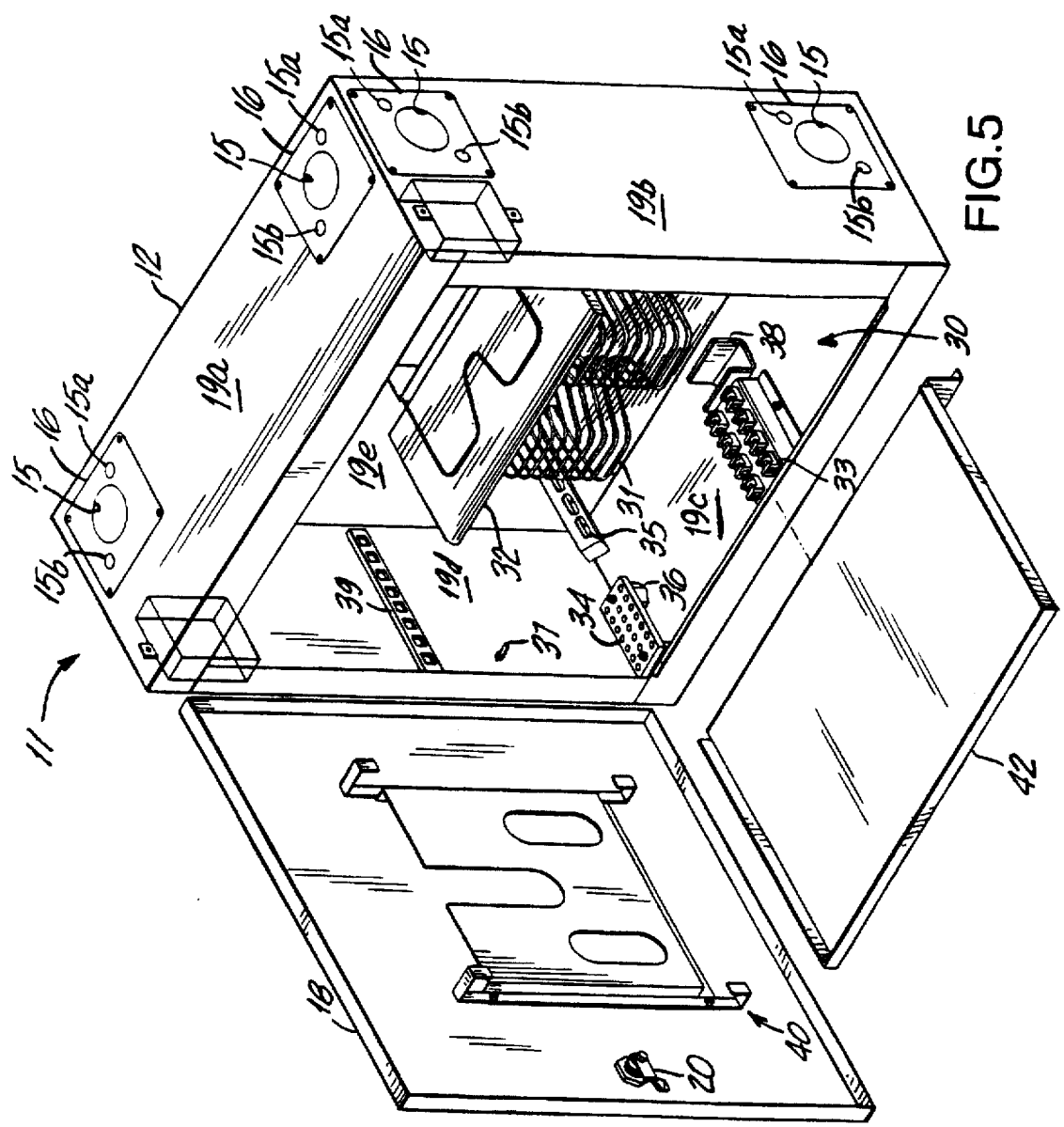
FIG. 5 is a perspective view of a storage and splicing enclosure in accordance with the invention.
Figure 6:
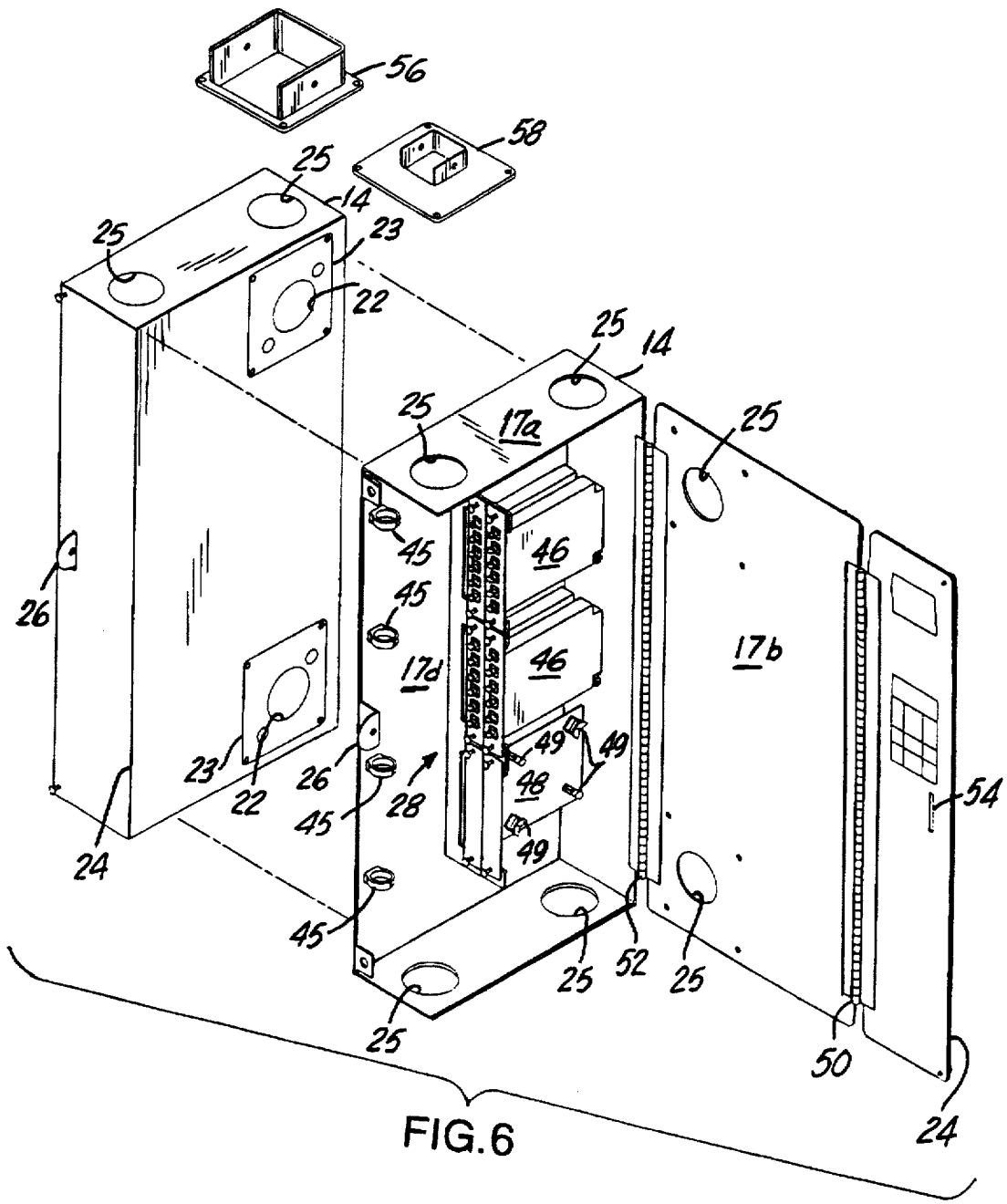
FIG. 6 is a perspective view of termination enclosures in accordance with the invention.

With reference to FIGS. 4–6, there is shown the optical fiber enclosure system 10 in greater detail. Storage and splicing enclosure 12 includes a base portion 19 having four walls 19a, 19b, 19c and 19d and a back 19e. Attached to base portion 19 is a door 18. Door 18 is hinged to wall 19d of base portion 19 via hinges 60 (see FIG. 7). Door 18 is reversible. Hinges 60 may be removed from wall 19d, rotated 180° and reattached to wall 19b. When closed, door 18 is held in place by latch 20.

Base portion 19 has ports 70 (see FIG. 13) on each of its four walls 19a, 19b, 19c and 19d. Ports 70 are covered by cover plates 16. Cover plates 16 have plugs 15 which may be removed to permit access to the interior of storage and splicing enclosure 12. Cover plates 16 also may contain plugs 15a and 15b to permit ground wire access to the interior of storage and splicing enclosure 12. The ports 70 in the walls 19a, 19b, 19c and 19d of base portion 19 of storage and splicing enclosure 12 are preferably 4 inches in diameter, the plugs 15 in cover plates 16 are preferably 2 inches in diameter and the plugs 15a and 15b in cover plate 16 are preferably ½–⅝ inch in diameter. The ports 70 allows fiber optic cables to be routed from an external source, e.g. conduit 2, into storage and splicing enclosure 12. Depending on the size of fiber optic cable 2a, cover plates 16 may be used with plugs 15 removed to access a 2 inch diameter hole or cover plates 16 may be removed to access 4 inch diameter port 70. Through ports 70, cover plates 16 and plugs 15 on walls 19a, 19b, 19c and 19d, storage and splicing enclosure 12 may accept a number of incoming fiber optic cables from alternative directions.

Storage and splicing enclosure 12 may be configured as a cable pull box for fiber optic cable storage alone, if desired, or, as intended to be used, as a storage and splicing enclosure for storing fiber optic cable and facilitating splicing of optical fibers.

Termination enclosure 14 also has a base portion 17 having four side walls 17a, 17b, 17c and 17d and a back 17e. Side wall 17b is attached to back 17e by hinge 52 at one end and is attached to a door 24 by hinge 50 at its other end. Side wall 7b and door 24 comprise a double hinged door to facilitate access to the interior of termination enclosure 15 (generally indicated by 28).

Side walls 17a, 17b, 17c and 17d contain ports 25. Ports 25 may be covered by cover plates 23. Cover plates 23 have plugs 22 that can be removed to facilitate access to the interior 28 of termination enclosure 14. Cover plates 23 also have plugs 22a and 22b to permit ground wire access to the interior 28 of termination enclosure 14. Ports 25 are preferably 3 inches in diameter, plugs 22 are preferably 2 inches in diameter and plugs 22a and 22b are preferably ½–⅝ inch in diameter. In the interior 28 of termination enclosure 14 are optical fiber termination modules 46. Through ports 25 and plugs 22, fiber optic cable attached to termination modules 46 may be routed from the termination enclosure 14 to the storage and splicing enclosure 14.

Termination enclosures 14 may be mounted to the storage and splicing enclosure 12 at any of its walls 17a, 17b, 17c and 17d. In addition, a termination enclosure 14 may be mounted to another termination enclosure 14, in a piggy-backing fashion, as shown in FIG. 4.

Side walls 17b and door 24, which in cooperation with hinges 50 and 52 comprises the double hinged door of termination enclosure 14, are, when closed, held in place by latch 26 in conjunction with slot 54 on door 24.

Attached to door 18 of storage and splicing enclosure 12 and facing the interior 30 of the enclosure 12 is a document holder 40 that may be used by a service technician to hold documents when splicing optical fibers in the enclosure 12. To further facilitate the splicing of optical fibers, work tray 42 removably attaches to the wall 19c of the storage and splicing enclosure 12. Work tray 42 may be used by a service technician to rest tools and supplies used during splicing of optical fibers.

Attached to the back 19e of storage and splicing enclosure 12 is a splice tray holder 31. Splice tray holder 31 is preferably designed to hold 12 splice trays 32. Attached to wall 19c of storage and splicing enclosure 12 is a channel member 38. Channel member 38 is designed to securely retain excess fiber optic cable inside storage and splicing enclosure 12 (see FIG. 14). Attached to wall 19c of storage and splicing enclosure 12 are moveable cable mounting brackets 33. Moveable cable mounting brackets 33 are designed to securely retain excess buffer tubes inside storage and splicing enclosure 12 (see FIG. 14). Clips 35 are also attached to the interior of storage and splicing enclosure 12. Clips 35 securely retain individual optical fibers inside storage and splicing enclosure 12 (see FIG. 14). Tie wrap brackets 39 are attached to walls 19a, 19b and 19d. The tie wrap brackets 39 may be used in conjunction with channel members 38 and moveable cable mounting brackets 33 to secure fiber optic cables and buffer tubing to the interior 30 of storage and splicing enclosure 12 (see FIG. 14).

Storage and splicing enclosure 12 is grounded by ground studs 37 on side walls 19d and 19b. Ground buss bars 34 are provided inside storage and splicing enclosure 12 for grounding the optical fibers (see FIG. 14). The ground buss bars 34 are isolated from the storage and splicing enclosure 12 by insulators 36. Ground buss bars 34 are mounted to wall 19c at locations proximate to walls 19b and 19d.

Attached to wall 17d of termination enclosure 14 are termination modules 46 and an optical fiber storage module 48. Termination modules 46 facilitate termination of optical fibers. Termination enclosure 14 is designed to house up to 6 termination modules. Storage module 48 has pegs 49 that facilitate storage of optical fibers. The optical fibers attached to termination modules 46 that extend into the storage and splicing enclosure 12 may be wrapped around pegs 49 on storage module 48 as a means of securing and storing excess optical fiber.

Clips 45 are also attached to wall 17d of termination enclosure 14. Clips 45 may be used to secure the optical fibers that connect the termination modules 46 to the equipment rack 9 to the inside of the enclosure 14 (see FIG. 3).

Channel conduit adapters 56 and 58 may be attached to cover plates 23 or in lieu of cover plates 23 to termination enclosure 14. Channel conduit adapters 56 and 58 permit the attachment of thermoplastic fiber optic runway systems, such as that disclosed in U.S. patent application Ser. No. 425,798 which was filed on Apr. 20, 1995, to termination enclosure 14.

Figure 7:
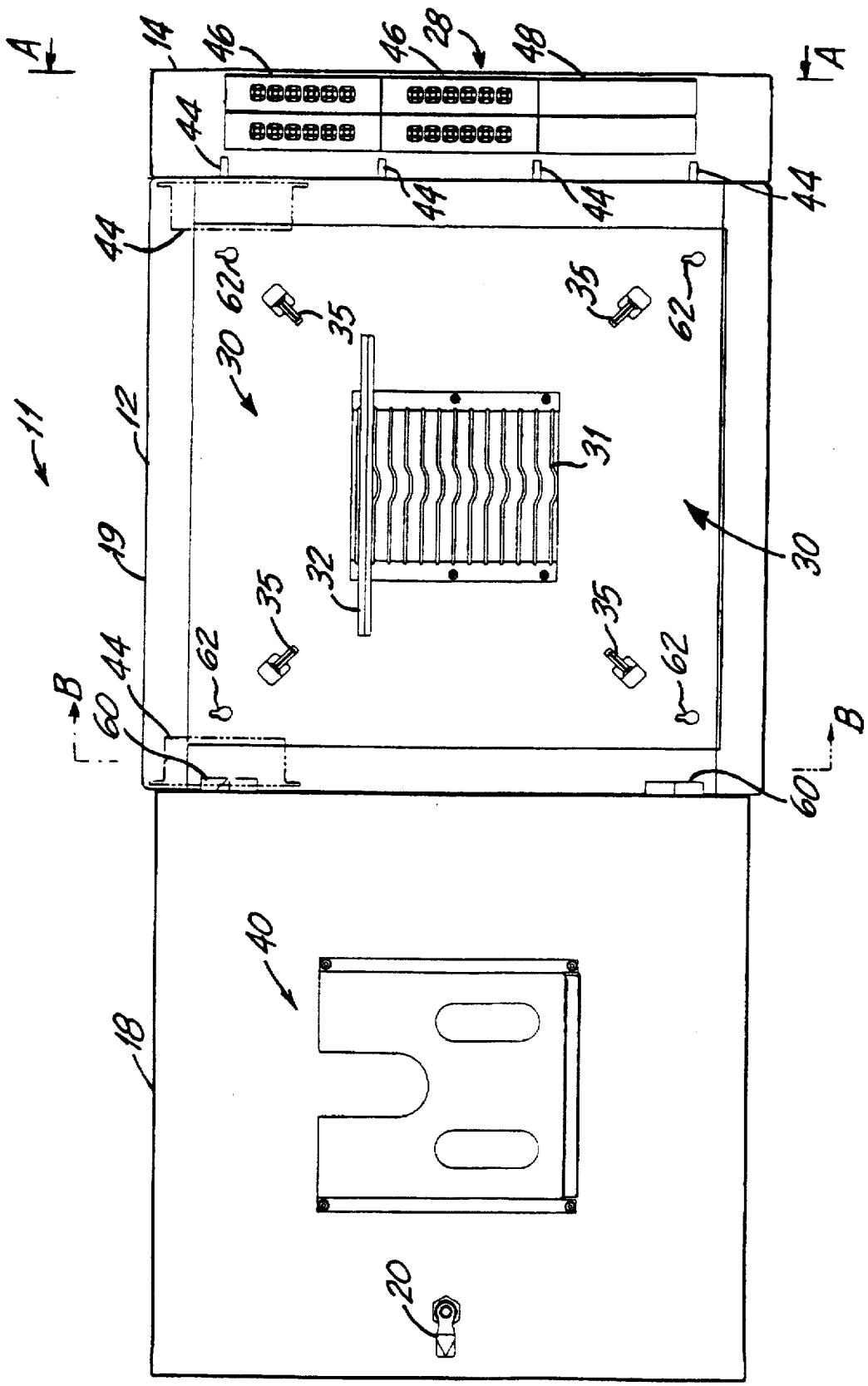
FIG. 7 is a front view of a fiber optic enclosure system in accordance with the invention.

With reference to FIG. 7, there is shown a front view of the optical fiber enclosure system 10 in accordance with the invention including storage and splicing enclosure 12 and termination enclosure 14 with their doors in an open position. Door 18 of storage and splicing enclosure 12 is secured to base 19 of the storage and splicing enclosure 12 by hinges 60. Storage and splicing enclosure 12 is designed so that it can be wall mounted by mounting brackets 62.

Figure 8:
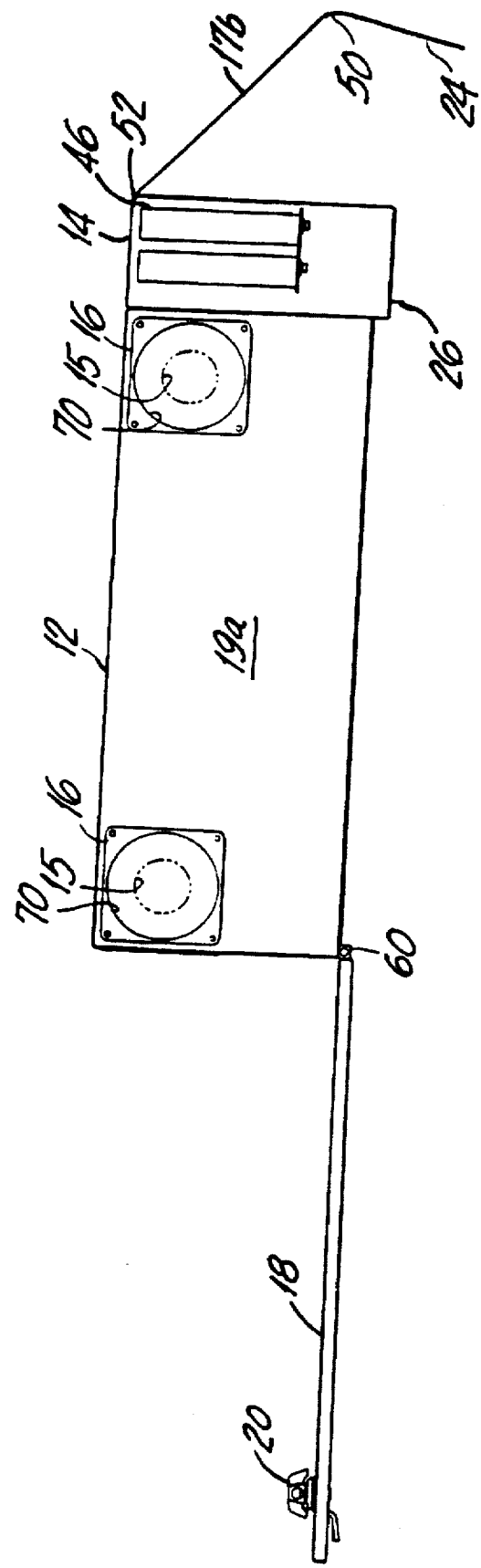
FIG. 8 is a top view of a fiber optic enclosure system in accordance with the invention.
Figure 9:
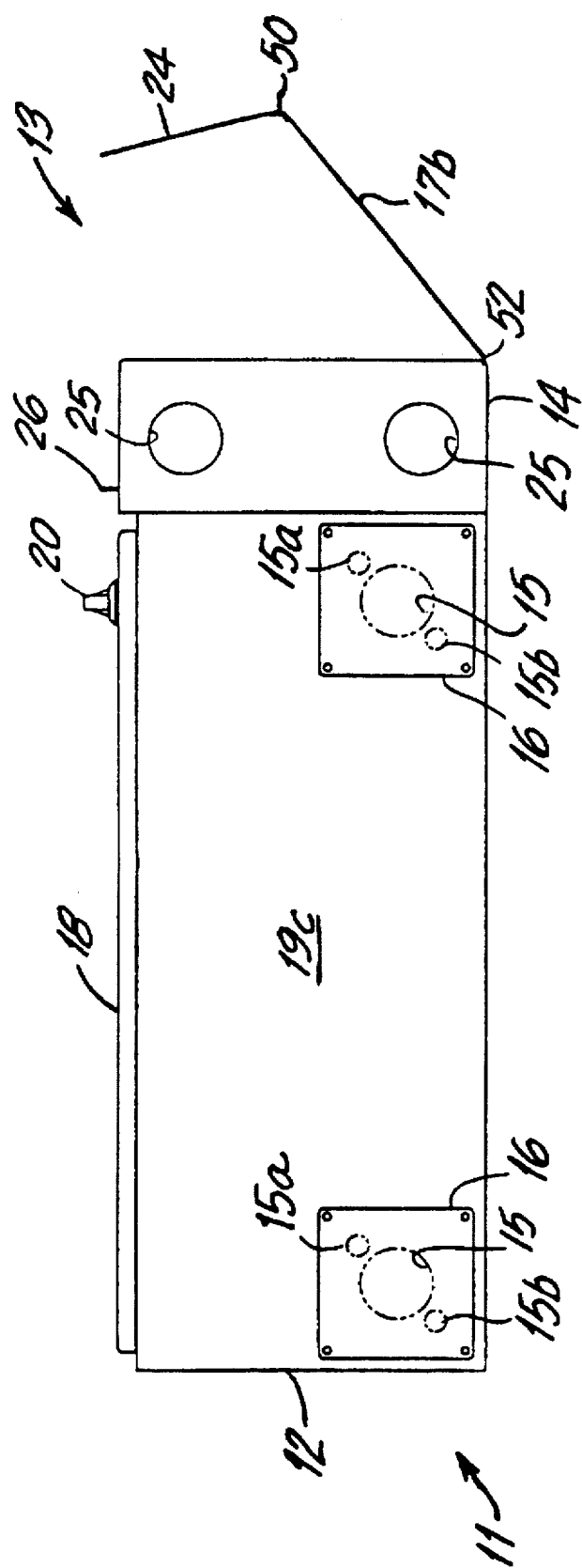
FIG. 9 is a bottom view of a fiber optic enclosure system in accordance with the invention.

With reference to FIGS. 8 and 9, there are shown top and bottom views respectfully of the fiber optic enclosure system 10 in accordance with the invention. Door 18 of storage and splicing enclosure 12 is in the open position in FIG. 8 and in the closed position in FIG. 9. Double hinged door 17b and 24 of termination enclosure 14 is in the open position in FIGS. 8 and 9.

Figure 10:
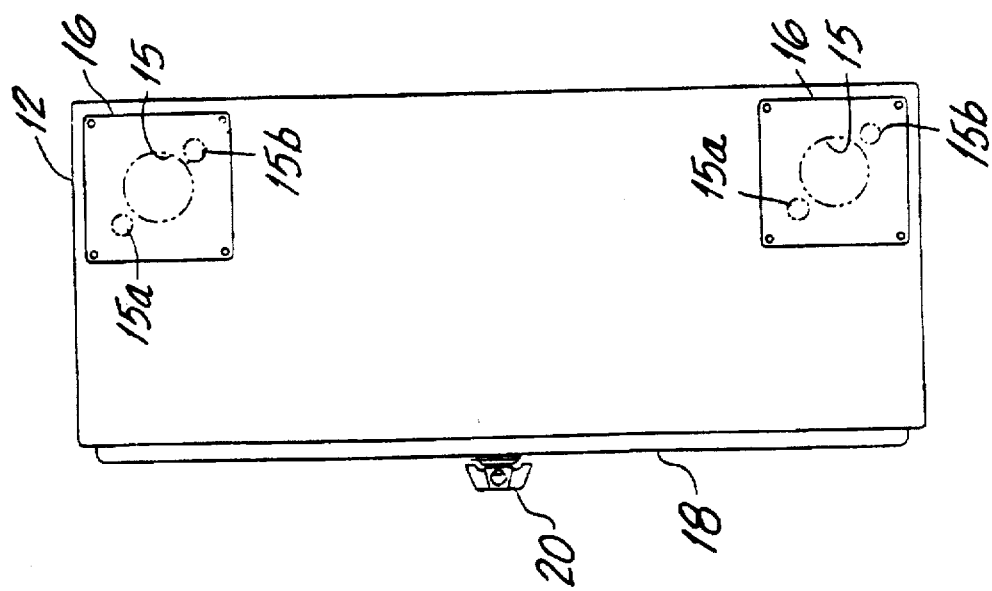
FIG. 10 is a right side view of a storage and splicing enclosure in accordance with the invention.
Figure 12:
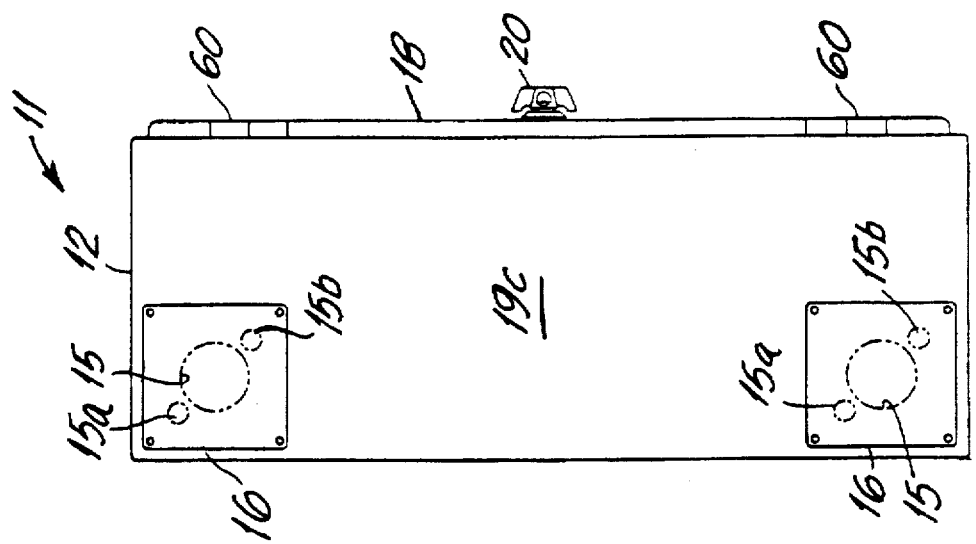
FIG. 12 is a left side view of a storage and splicing enclosure in accordance with the invention.

With reference to FIGS. 10 and 12, there are shown right side and left side views respectively of the storage and splicing enclosure 12 in accordance with the invention. Door 18 is in the closed position in both FIGS. 10 and 12.

Figure 11:
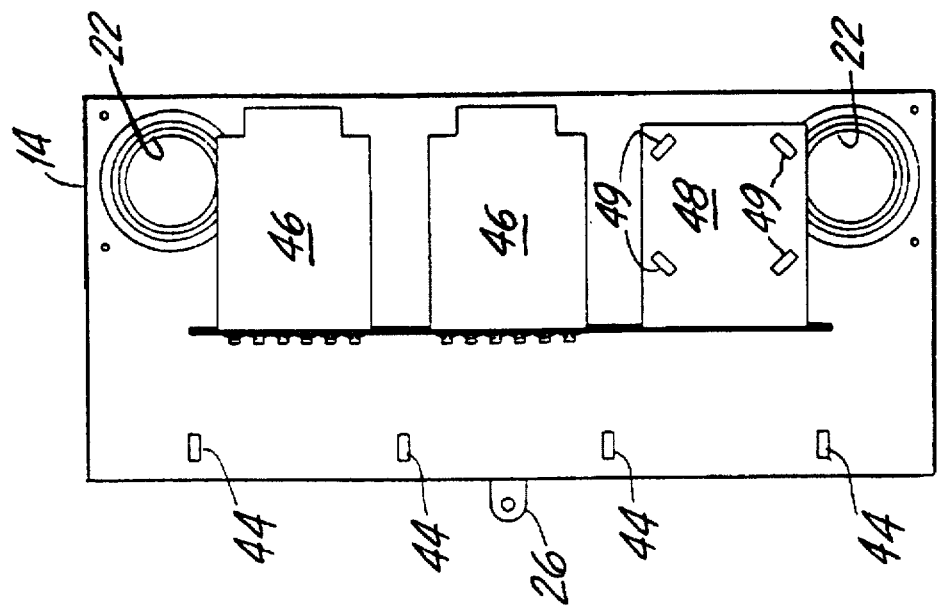
FIG. 11 is a sectional view along sectional lines A—A in FIG. 7 of a termination enclosure in accordance the invention.
Figure 13:
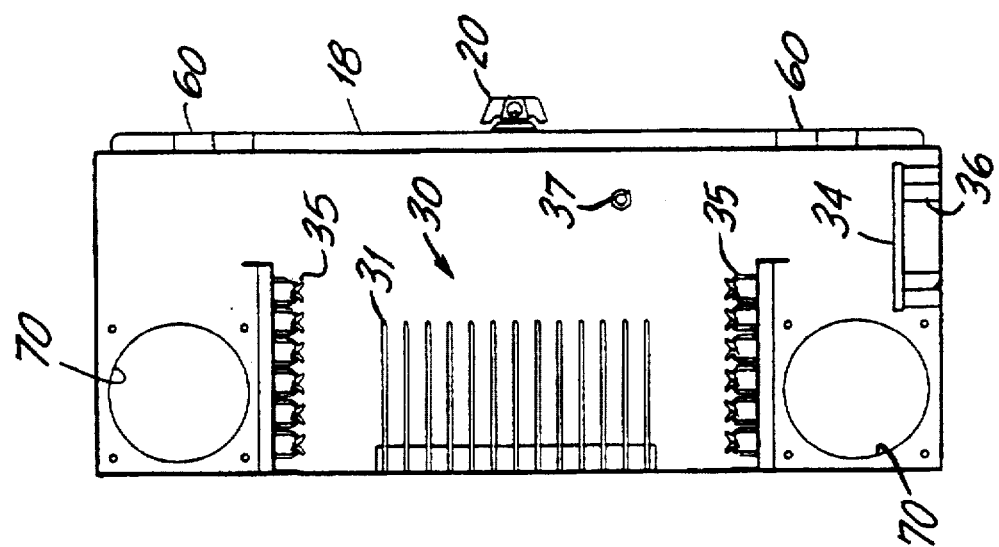
FIG. 13 is a sectional view along sectional lines B—B in FIG. 7 of a storage and splicing enclosure in accordance with the invention.
Figure 14:
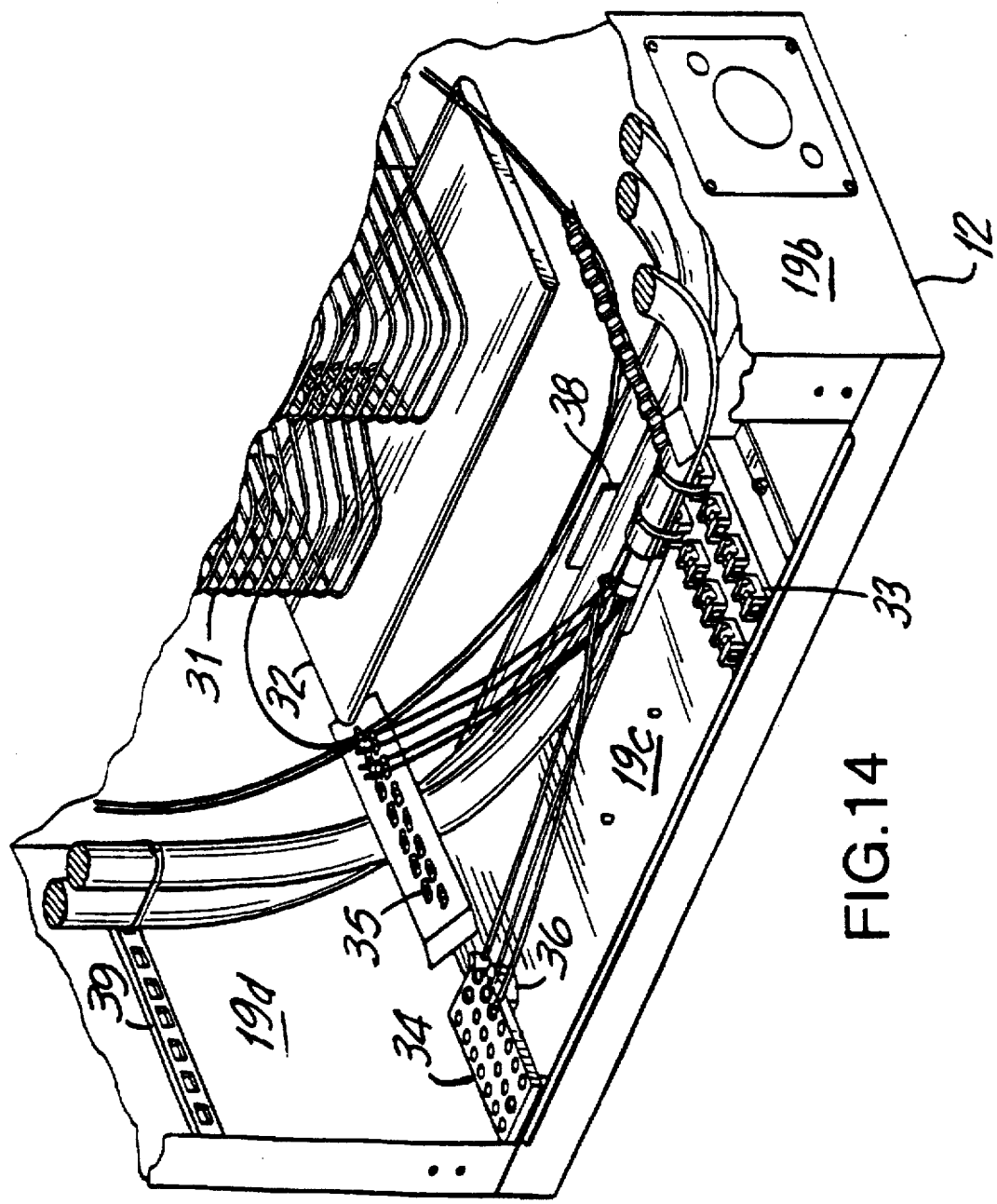
FIG. 14 is a cut away view of a storage and splicing enclosure in accordance with the invention.

With reference to FIG. 11, there is shown a sectional view along sectional lines A—A of FIG. 7 of termination enclosure 14 in accordance with the invention. With reference to FIG. 13, there is shown a sectional view along sectional lines B—B of FIG. 7 of storage and splicing enclosure 12 in accordance with the invention. With reference to FIG. 14, there is shown a cut away view of storage and splicing enclosure 12 in accordance with the invention showing mounting of fiber optic cables, buffer tubes and optical fibers in the storage and splicing enclosure.

The optical fiber enclosure system according to the invention, including the storage and splicing enclosure 12 and termination enclosure 14, must be strong enough to support fiber optic cable, splice trays, termination modules and additional attendant hardware contained within enclosures 12 and 14. In addition, the use of light weight materials in constructing the storage and splicing enclosure 12 and termination enclosure 14 is desired to facilitate installation of the optical fiber enclosure system. Constructing storage and splicing enclosure 12 and termination enclosure 14 of sufficient strength and minimal weight would be apparent to persons skilled in the art. Light weight aluminum construction serves the dual requirements of strength and light weight.

The optical fiber enclosure system in accordance with the invention, including storage and splicing enclosure 12 and termination enclosure 14, may be made of suitable dimensions to fulfill its intended purposes. Construction of storage and splicing enclosure 12 having a height of 24 inches, a width of 24 inches and a depth of 11 inches has been found to be sufficient. Likewise, construction of termination enclosure 14 having a height of 24 inches, width of 4¼ inches and a depth of 11 inches has been found to be sufficient. Channel conduit adaptor 56 is suitable for connection to a 4 inch×4 inch fiber optic runway system conduit, whereas channel conduit adaptor 58 is suitable for connection to a 2 inch×2 inch fiber optic runway system conduit.

While the present invention has been described by reference to various preferred embodiments, it will be understood by persons skilled in the art that many modifications and variations may be made in those preferred embodiments without departing from the spirit and scope of the present invention. Accordingly, it is intended that the invention not be limited to the disclosed preferred embodiments and that it have the full scope permitted by the following claims.

I claim:

1. An optical fiber enclosure system, comprising:
    a storage and splicing enclosure adapted to retain excess fiber optic cable and buffer tubing and facilitate splicing of optical fibers;
    a termination enclosure attached to an external surface of the storage and splicing enclosure and adapted to retain and facilitate termination of optical fibers;
    the storage and splicing enclosure including a base portion and a door, the base portion having walls, the base portion and the door cooperate to define an internal storage and splicing area and to form the external surface of the storage and splicing enclosure, at least one wall being adapted to receive the termination enclosure and having ports to facilitate passage of fiber optic cables and optical fibers;
    the termination enclosure including a base portion and a door, the base portion having walls, at least one wall being adapted to attach to the external surface of the storage and splicing enclosure and having ports to facilitate passage of optical fibers; and
    the ports on the storage and splicing enclosure and the ports on the termination enclosure match when the termination enclosure is attached to the external surface of the storage and splicing enclosure to facilitate passage of optical fibers between the storage and splicing enclosure and the termination enclosure.

2. The optical fiber enclosure system of claim 1 wherein the storage and splicing enclosure door is attached by hinges to the base portion of the storage and splicing enclosure to permit access to the internal storage internal storage and splicing area of the storage and splicing enclosure.

3. The optical fiber enclosure of claim 2 wherein the termination enclosure door is attached to the base portion of the termination enclosure to permit access to an internal termination area of the termination enclosure.

4. The optical fiber enclosure system of claim 3 wherein the storage and splicing enclosure further comprises hardware for retaining excess fiber optic cable and buffer tubing and spliced optical fibers and the hardware for retaining excess fiber optic cable comprises a channel member and brackets.

5. The optical fiber enclosure system of claim 4 wherein the hardware for retaining excess buffer tubing in the storage and splicing enclosure comprises brackets.

6. The optical fiber enclosure system of claim 5 wherein the hardware for retaining spliced optical fibers comprises clips.

7. The optical fiber enclosure system of claim 3 wherein the termination enclosure further comprises hardware for terminating and retaining optical fibers and the hardware for terminating optical fibers comprises a termination module.

8. The optical fiber enclosure system of claim 7 wherein the hardware for retaining optical fibers in the termination enclosure comprises clips.

9. The optical fiber enclosure system of claim 8 further comprising an optical fiber storage module contained in the termination enclosure.

10. The optical fiber enclosure system of claim 3 having three termination enclosures.

11. The optical fiber enclosure system of claim 3 having four termination enclosures.

12. The optical fiber enclosure system of claim 3 wherein a second termination enclosure is attached to the termination enclosure attached to the storage and splicing enclosure.

13. The optical fiber enclosure system of claim 3 further comprising cover plates for covering the ports; and the cover plates having removable plugs.

14. The optical fiber enclosure system of claim 3 further comprising a document holder attached to the door on the storage and splicing enclosure and a work tray attached to the base portion of the storage and splicing enclosure.

15. The optical fiber enclosure system of claim 3 further comprising a ground buss bar isolated from the base portion of the storage and splicing enclosure by insulators.

16. The optical fiber enclosure system of claim 3 wherein the door on the termination enclosure comprises a double hinged door.

17. The optical fiber enclosure system of claim 3 having two termination enclosures.

18. The optical fiber enclosure system of claim 2 wherein the door on the storage and splicing enclosure is reversible.

19. The optical fiber enclosure system of claim 1 wherein the termination enclosure can be attached to any of the walls of the storage and splicing enclosure.

20. An optical fiber enclosure system, comprising:
    a storage and splicing enclosure;
    the storage and splicing enclosure including a base portion having walls, at least one wall having an external surface adapted to receive a termination enclosure and having ports to facilitate passage of fiber optic cables and optical fibers;
    the ports on the storage and splicing enclosure match ports on the termination enclosure when the termination enclosure is attached to the external surface of the wall of the storage and splicing enclosure to facilitate passage of optical fibers between the storage and splicing enclosure and the termination enclosure.

21. The optical fiber enclosure system of claim 20 having two or more termination enclosures.

22. The optical fiber enclosure system of claim 21 wherein a second termination enclosure is attached to the termination enclosure attached to the storage and splicing enclosure.

23. The optical fiber enclosure system of claim 20 wherein the termination enclosure can be attached to any of the walls of the base portion of the storage and splicing enclosure.

* * * * *